(12) United States Patent
Bump (10) Patent No.: US 6,572,257 B2
(45) Date of Patent: Jun. 3, 2003

(54) COMBINATION MIXER COUNTER AND WEIGHT CALCULATOR UNIT FOR AGRICULTURAL MIXER AND METHOD THEREFOR

(75) Inventor: Jerome A. Bump, Fort Atkinson, WI (US)

(73) Assignee: Digi-Star, LLC, Fort Atkinson, WI (US)

(*) Notice: Subject to any disclaimer, the term of this patent is extended or adjusted under 35 U.S.C. 154(b) by 0 days.

(21) Appl. No.: 09/773,069

(22) Filed: Jan. 31, 2001

(65) Prior Publication Data

US 2002/0101781 A1 Aug. 1, 2002

(51) Int. Cl.[7] ................................. B01F 15/00
(52) U.S. Cl. ................. 366/141; 366/142; 366/603
(58) Field of Search .................. 366/141, 142, 366/297–301, 314, 318, 603; 177/136, 245, DIG. 5; 73/514.39, DIG. 3; 235/103

(56) References Cited

U.S. PATENT DOCUMENTS

| | | | | |
|---|---|---|---|---|
| 3,496,343 A | * | 2/1970 | Johanson | |
| 3,548,165 A | * | 12/1970 | Linnenkamp | |
| 3,582,969 A | * | 6/1971 | Kinney | |
| 4,403,867 A | * | 9/1983 | Duke | |
| 4,547,660 A | * | 10/1985 | Whitson | |
| 4,597,672 A | * | 7/1986 | Neier et al. | |
| 5,148,999 A | * | 9/1992 | Curfman et al. | |
| 5,429,436 A | * | 7/1995 | Stone | |
| 5,782,559 A | * | 7/1998 | Neier et al. | |

OTHER PUBLICATIONS

Oswalt Mixers by J–Star Brochure, 1997.
Rotation Counter with Clock information.
Omni Measurement Systems, Inc., advertisement for the OMS–510 Digital Scale System.

* cited by examiner

Primary Examiner—Charles E. Cooley
(74) Attorney, Agent, or Firm—Nicholas A. Kees; Godfrey & Kahn, S.C.

(57) ABSTRACT

An electronic device that is attached to a mixing machine for calculating the weight of the material being mixed and the number of auger revolutions that has occurred during the mixing process, and a method therefor. The electronic device can display the weight and auger revolutions, and store such information in the device memory or an external memory. The data relating to mixing a particular batch of ingredients can be stored in the memory and used to determine operator productivity and mixer maintenance schedules. An alarm alerts the mixer operator when a predetermined number of revolutions has occurred.

25 Claims, 8 Drawing Sheets

COMBINATION MIXER COUNTER AND WEIGHT CALCULATOR UNIT FOR AGRICULTURAL MIXER AND METHOD THEREFOR

BACKGROUND OF THE INVENTION

The present invention relates generally to electronic measuring devices used for agricultural applications, and more particularly, to a combination electronic scale and mixing counter used for weighing and mixing animal feed.

Feed mixers in the agricultural market are used to mix or blend a variety of forage products (such as hay, corn, cotton seed, etc.) together before delivering it to livestock as feed. As seen in FIGS. 1 through 8, feed mixers are generally constructed from a large receptacle 10 with an open top for receiving the forage products. Contained within the receptacle 10 is some type of rotating device used to stir, mix and possibly chop the forage products.

Figure 2:
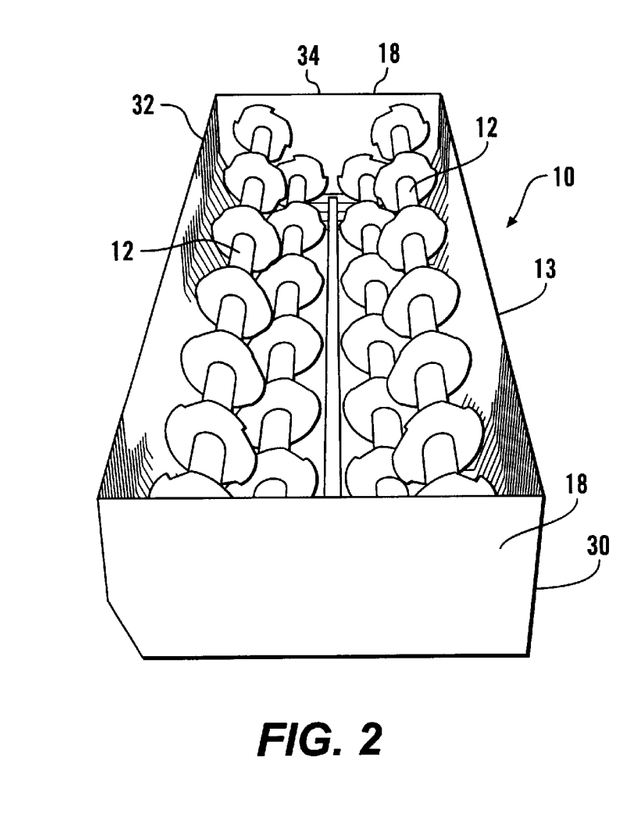
FIG. 2 is a top perspective view of the feed mixer shown in FIG. 1.
Figure 3:
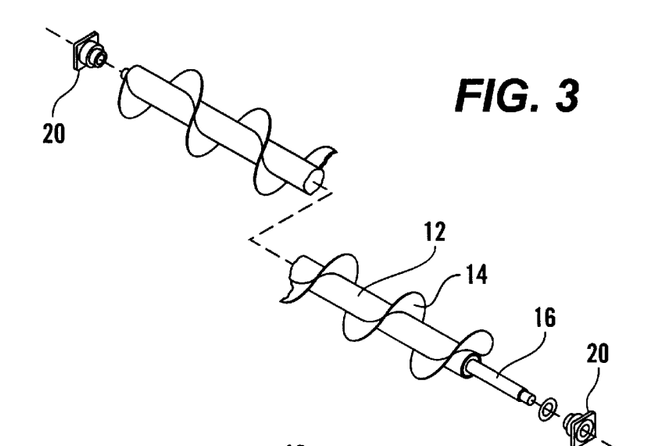
FIG. 3 is perspective view of an auger of the type used in the feed mixer of FIG. 2.

The feed mixer 10 shown in FIG. 2 is a very common style of mixer that has a plurality of horizontally positioned augers 12 rotatably secured within a receptacle 13. These augers 12 are generally composed of some type of spiral blade or flight 14 on a shaft 16, such as that seen in FIG. 3. Augers 12 connect to the receptacle walls 18 with bearings 20, and are driven by a drive assembly 22, such as that shown in FIG. 4.

Figure 4:
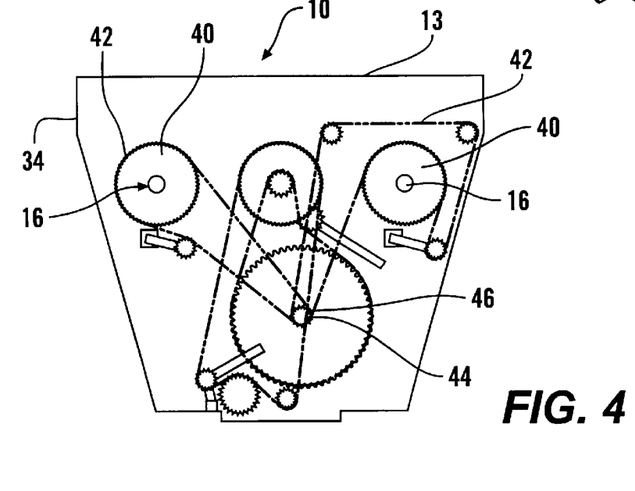
FIG. 4 is an example of a feed mixer drive assembly for a horizontal feed mixer.
Figure 8:
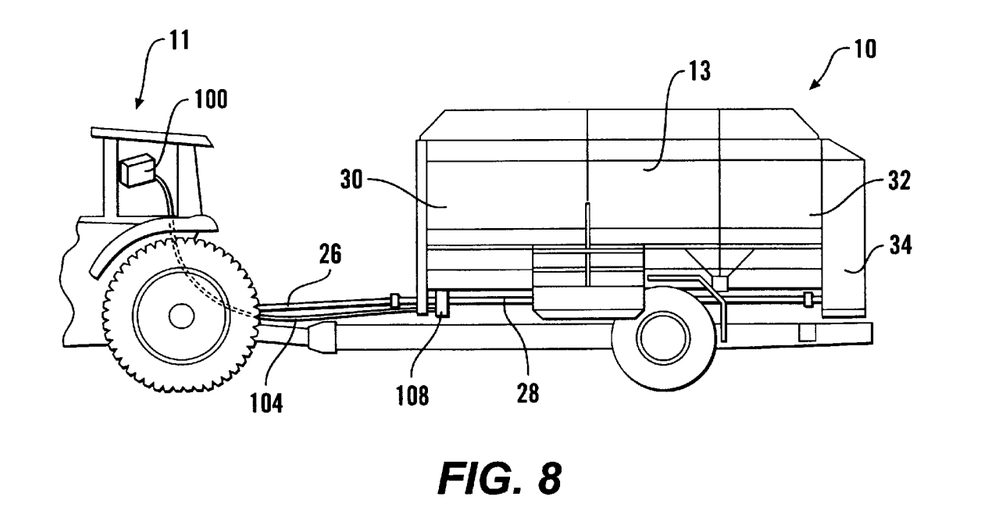
FIG. 8 is a partial side elevation of the feed mixer of FIG. 1 as attached to a tractor and showing a cut-away view of the drive train.

As best illustrated in FIG. 8, at the front section 30 of receptacle 10 is a power take-off shaft (PTO) 26 that connects to a tractor or the like. A line shaft 28 extends underneath the mixer receptacle 10 from the receptacle front section 30 to the rear section 32, and is connected to a drive assembly contained in housing 34 (see drive assembly of FIG. 4). The at least two of the augers 12 in the example of FIGS. 2–3 have sprockets 40 connected thereto for engaging the drive assembly, as shown in FIG. 4. Chains 42 are used to connect a primary drive sprocket 44 driven by the line shaft 28 (not shown) to the sprockets 40. In the example shown, there is only one stage of reduction from the primary drive sprocket 44 to the auger sprockets 40. Different stages of power reduction are commonly achieved by replacing the sprockets 40 and 44 with sprockets of different sizes.

Figure 5:
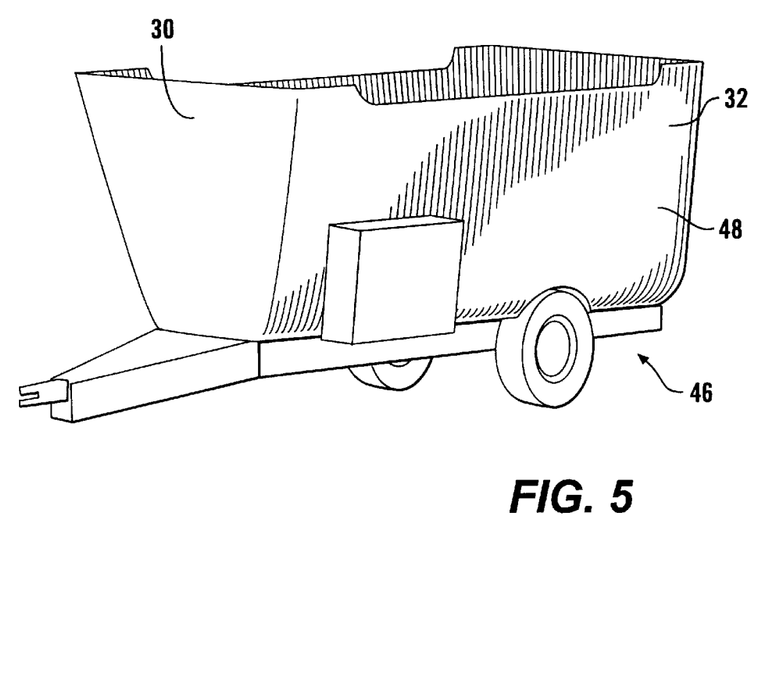
FIG. 5 is a side perspective view of a trailer-style vertical feed mixer incorporating the present invention.
Figure 6:
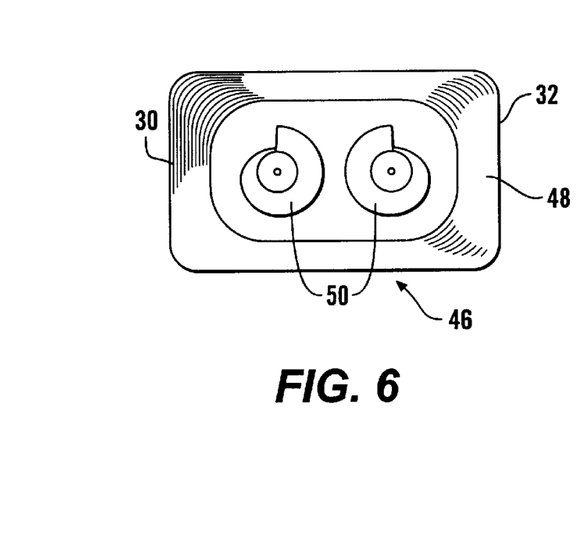
FIG. 6 is a top perspective view of the feed mixer shown in FIG. 5.

Another common type of feed mixer is shown in FIGS. 5 and 6. This type of feed mixer 46 has a pair of vertically oriented augers 50 rotatably secured in a receptacle 48. The augers 50 are driven in a manner similar to that previously described herein. Both types of feed mixer receptacles can be attached to a truck chassis instead of a trailer bed. For example, receptacle 13 is shown mounted permanently to a truck chassis in FIG. 7.

In operation, regardless of the type of mixer used, an operator loads the receptacle using a feed recipe specially formulated for a given herd of animals, i.e. dairy cows. The forage products are added by weight, which is measured by an electronic scale underneath the receptacle. Electronic weight display units are positioned near the operator for convenience.

Specially formulated feed mixtures are important for maintaining the health of the animal herd, and for achieving an expected quality of animal products such as meat, eggs, milk or hide. Even if special additives are not used, i.e. medication or specially treated feed, it is important to mix the ingredients well, without under- or over-mixing.

Under-mixing is quite detrimental because it enables the animals to pick out the tastiest or otherwise most desirable ingredients and leave the rest. This results in an imbalanced diet and wasted food. Over-mixing is detrimental because the forage materials are cut or ground into small particles which are too small for the animal to eat, or which blow away easily. This too results in an imbalanced diet and wasted food. Furthermore, it results in needless wear and tear on the mixer equipment, which can lead to early failure of the feed mixer.

It is up to the operator of the feed mixer to determine when a mixture is sufficiently mixed to an optimum blend. Unfortunately, this can be difficult to determine by simply viewing the mixture. To solve the problem of determining when the feed is properly mixed, timing devices that time how long the feed has been mixed are used. However, this is not an ideal solution because the augers may not always operate at the same speed, depending on the mixer engine speed, the viscosity of the feed ingredients, and the condition of the mixing equipment. In an effort to overcome these variations, the mixer counters have been used to count the number of rotations made by the mixing augers 12. Such mixer counters are electronic devices that measure the auger rotations with a magnetic switch. A display unit is mounted on or near the receptacle for the mixer operator. Unfortunately, this requires the operation, expense and maintenance of more than one display unit, i.e. one display unit for weighing and one display unit for counting. The two display units also can take up significant space if mounted in the rather small tractor or truck cabs.

There are additional problems associated with mixing feed. A first problem is that the operators do not always carefully monitor the mixing process. The operator may be in a hurry and decide to stop the mixing process a little early, or the operator may take a break during the mixing process and leave it run too long. The farm owner may not realize such practices are happening because the operator is usually not supervised when out in the field. A second problem is associated with maintenance of the mixing equipment. One of the biggest maintenance problems is auger wear, and usage time is not an accurate indicator of when a mixer needs maintenance. The auger blades can become thin with use, resulting with weaker blades and altered performance, i.e. cutting improperly.

Therefore, there remains a need for a mixing counter that is convenient to use and maintain. There is also a need for monitoring the mixing practices of hired operators. There is a further need for accurately determining when maintenance is required.

SUMMARY OF THE INVENTION

The functional features of the electronic device of the present invention include: 1) accurately counting the effective revolutions of the mixing structure; 2) notifying the mixer operator when mixing is complete, or providing mixer automatic shut-off; 3) determining when mixer maintenance is needed; 4) recording the habits of mixer operators; 5) providing weight information; 6) displaying the information in a single unit that can be conveniently mounted within the mixer operator's view during use; and 7) storing different mixing regimens for different types of agricultural mixtures.

For the purpose of demonstration, the mixer counter is shown in an agricultural feed mixer. This example is not intended to limit the scope of the invention.

The combination mixer counter and weight calculator of the present invention is used when mixing and weighing agricultural forage in a mixing machine. A load cell is placed on the mixing receptacle, and a sensor for sensing rotation is placed on a rotatable shaft in the mixing machine. The sensor and the load cell are electrically connected by a cable to an electronic device or "indicator" housed in a single unit. The indicator specifically calculates and displays the number of auger rotations used to mix the forage, and the weight of the forage.

The method of using the indicator for weight and mixer counter measurements is generally provided by the following steps. A mixing machine having a receptacle and an auger within the receptacle for mixing forage is provided. A load cell (scale) is attached to the receptacle for sensing the weight of any forage placed in the receptacle. A sensor is attached to any shaft used to drive the auger. Both the load cell and sensor are electrically connected to the indicator, which is capable of calculating weight and the number of auger revolutions from electrical signals supplied from the load cell and sensor, respectively. The indicator calculates the number of auger revolutions by using electrical input pulses from the sensor.

The present invention will be better understood from the following detailed description of the invention, read in connection with the drawings as hereinafter described.

DESCRIPTION OF THE PREFERRED EMBODIMENT

The device of the present invention is a combination electronic weight and mixer counter calculator and display, otherwise known as the indicator 100. Indicator 100 receives electrical signals from the various hardware described herein. These electrical signals are transformed into weight and mixer count information.

The hardware used to sense the weight in the mixing receptacle includes a load cell, shown generally as black box 108 in FIG. 8. The load cell is electronically connected to indicator 100 by an electrical lead 106 (see FIG. 8).

Figure 7:
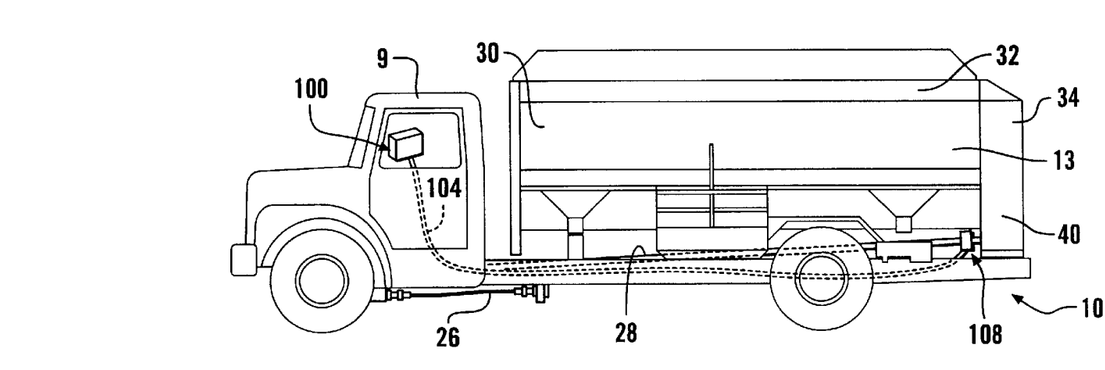
FIG. 7 is a side elevation of a feed mixing truck employing the mixer counter of the present invention.

The hardware used to sense the number of auger revolutions in a mixer generally consists of a proximity sensor and magnet, shown generally as a black box 102 in FIG. 8. The sensor is electronically connected to indicator 100 by an electrical lead 104 (see FIG. 8). The magnet may be mounted on any shaft driving an auger in a mixing device, regardless of whether the shaft is directly connected to an auger 12. For example, FIGS. 7 and 8 illustrate the drive system that indirectly drives the augers. For the truck-style mixer, the magnet may be mounted at various locations on PTO 26, or the rear line shaft 28 as shown in FIG. 7. For the trailer-style mixer, it is preferable that the magnet be mounted in a more protected location, such as on the line shaft 28, rather than on the exposed PTO 26 where it is less protected from possible impact damage. As seen in FIG. 4, the magnet may be attached to either auger shaft 16, or on a primary drive shaft 46. If the shaft to which the magnet is attached is indirect, a "drive ratio" is used to determine actual auger revolutions, as described herein.

By accounting for the drive ratio, the actual number of auger turns can be displayed regardless of speed difference between the auger shaft 16 and the shaft to which the magnet is mounted. Specifically, the drive ratio is a number that tells the indicator how many pulses equals one mixer revolution. The drive ratio can be any number ranging from about 0.01 to 999.99 However, the displayed mixer revolutions are most accurate when the drive ratio is a whole number such, i.e. 1 or 50.

The mixer counter determines the displayed revolution count by dividing the number of pulses by the drive ratio. Thus, if the drive ratio is a fraction such as 6.63 or 27.50, the mixer counter may have a total mix revolution error of +/−1 pulse. The mixer counter is displayed "REVxxx" and is rounded to the nearest whole revolution (REV), assuming, as is the preferred embodiment, that there is only a single magnet on the shaft. For example, a drive ratio of 6.63 will display "REV 1" after 7 pulses (7 pulses/6.63=1.055 or 1 when rounded) and "REV 9" after 60 pulses (60 pulses/6.63=9.049 or 9 when rounded). Other embodiments could include different numbers of magnets, and would generate different numbers of pulses per revolution.

The number of auger revolutions to be counted during the mixing process preferably ranges from about 1 to 999. The desired count information is entered on a user interface such as a key or touch pad on the indicator 100 surface, which is preferably facing the operator. This key can be a dedicated key (i.e. Timer/Counter key) on a front panel, or accessed through a function menu on the indicator's electronic display.

Figure 1:
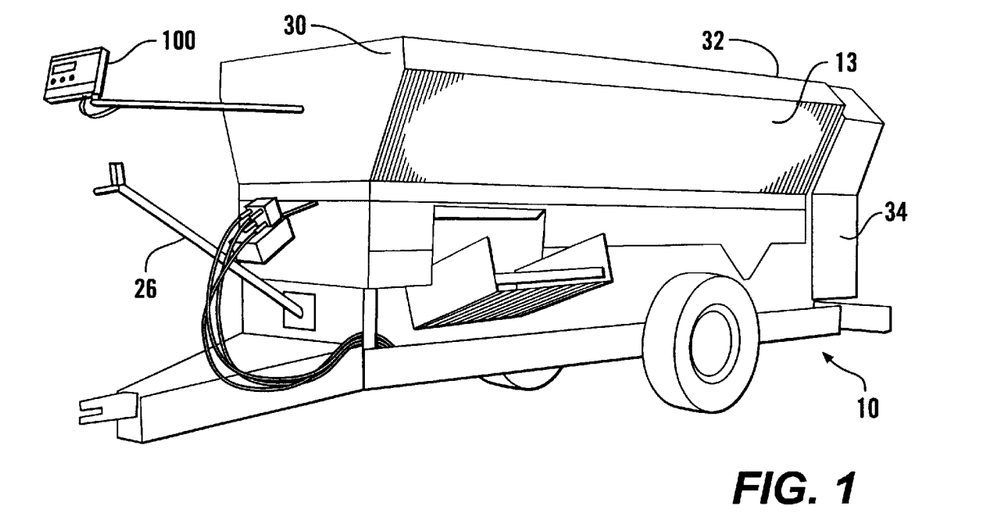
FIG. 1 is a side perspective view of a trailer-style horizontal feed mixer incorporating the present invention.

Indicator 100 may be mounted to the exterior of receptacle 13 as seen in FIG. 1, or in the truck cab 9 or tractor cab 11 as seen in FIGS. 7 and 8. It is desirable to mount the electronic display in a position that is convenient for the mixer operator to read, and possibly reach. If it is necessary for the operator to manually interact with indicator 100, it is preferable to mount it in the truck or trailer cab. For trailer-style mixers that may be pulled and driven by more than one tractor, indicator 100 may be mounted on the exterior of receptacle 13. Alternatively, indicator 100 may be mounted in the tractor cab, and electrically connected to cable 104 with a quick connect plug (not shown). When a quick connect plug is used, a single electronic display may be used for several different trailers.

Preferably, indicator 100 displays the number of remaining revolutions so that the operator knows how close it is to mixing completion without having to remember the required number of revolutions. If the mixer is not stopped at the end of the mixing cycle, the mixer counter will preferably continue to count revolutions and display them as negative numbers ("REV−3") until either the mixer counter is "cleared" electronically, or the mixer is stopped. Indicator 100 values may be displayed as "REV*99" once the revolutions exceed 999, or go past −99.

The number of revolutions and other mixing data, i.e. weight of individual and total ingredients, ingredient listing and the like, may be displayed on indicator 100 and electronically delivered to a printing device or another electronic storage device, such as a computer.

In the case where the weight and auger revolutions are not displayed simultaneously, when the mixer counting function is not being used, the indicator defaults to the weighing function and displays the Gross weight of the mixed ingredients.

The proximity sensor is preferably rated at about 12 volts DC, 20 milli-amps. Each time the magnet passes the proximity sensor, it creates an electrical input signal or "input pulse." The frequency of such signals or pulses is preferably not greater than about 25 Hz, or approximately 1500 RPM. The pulses are counted using the indicator circuitry, described herein, and preferably stored in a non-volatile type of memory, such as a non-volatile random access memory (NVRAM).

Figure 12:
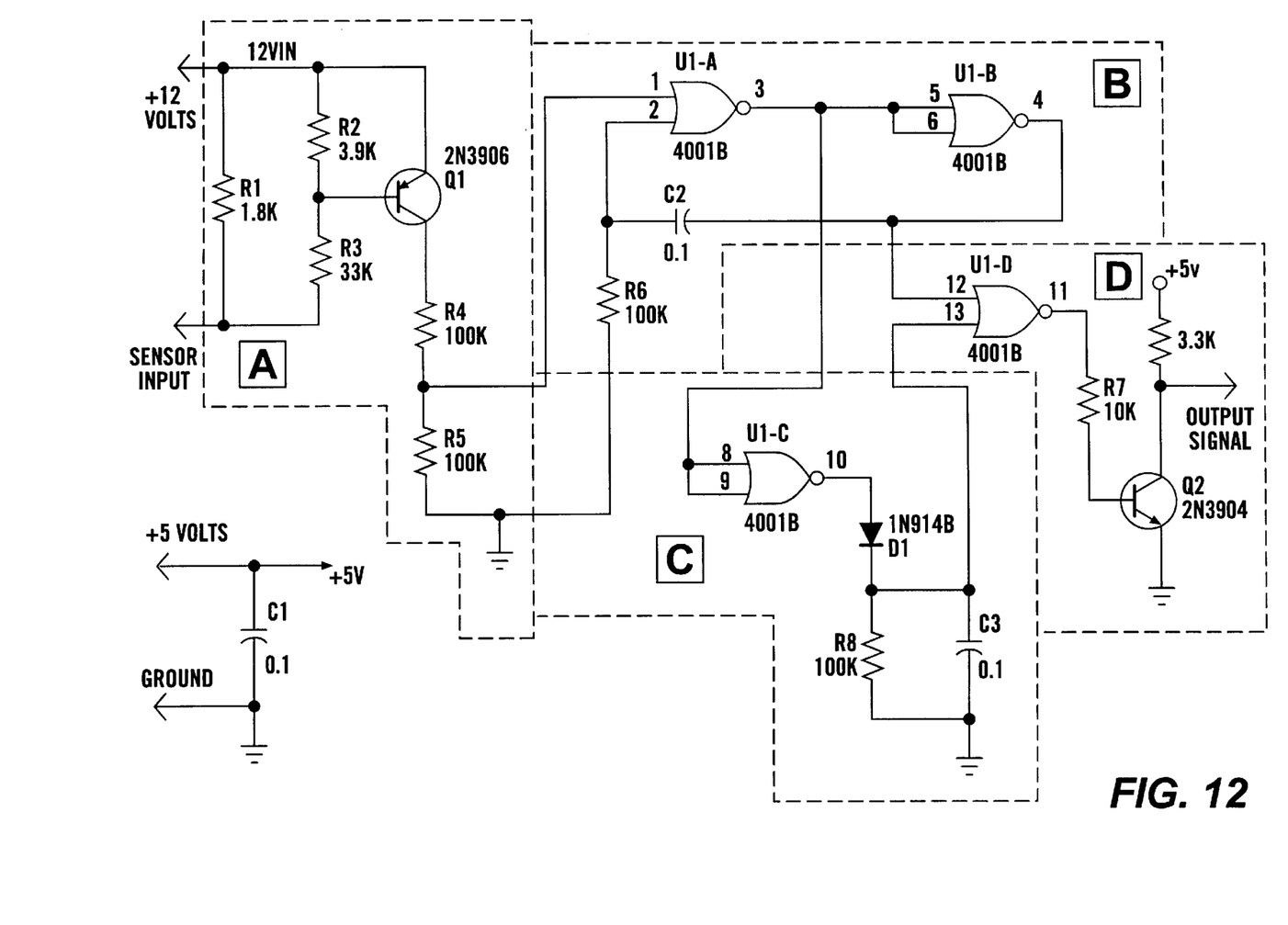
FIG. 12 is an electrical schematic for the circuitry of the present invention for processing electrical signals from a sensor.
Figure 13:
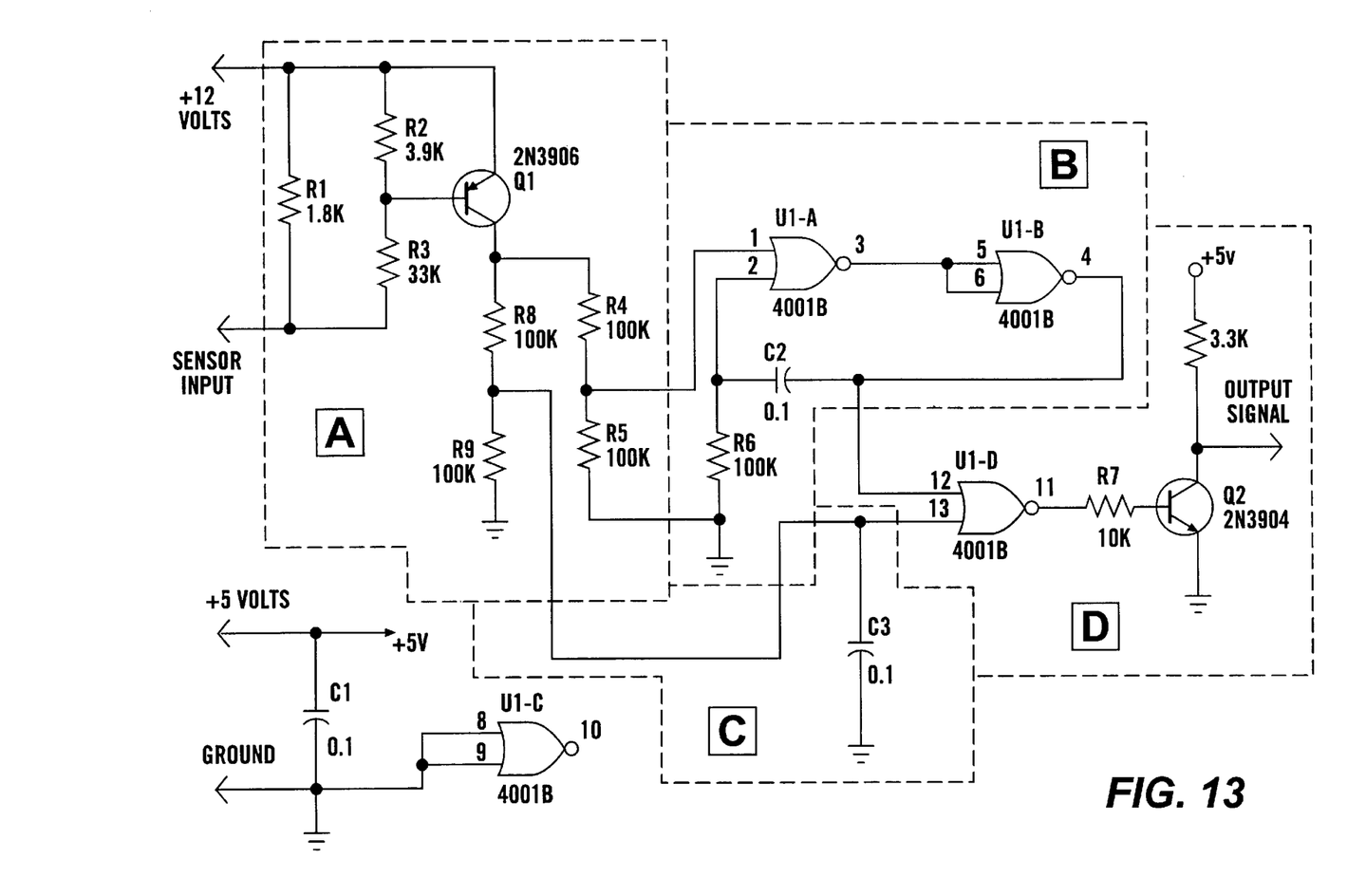
FIG. 13 is an electrical schematic of an another embodiment of the circuitry of the present invention.
Figure 14:
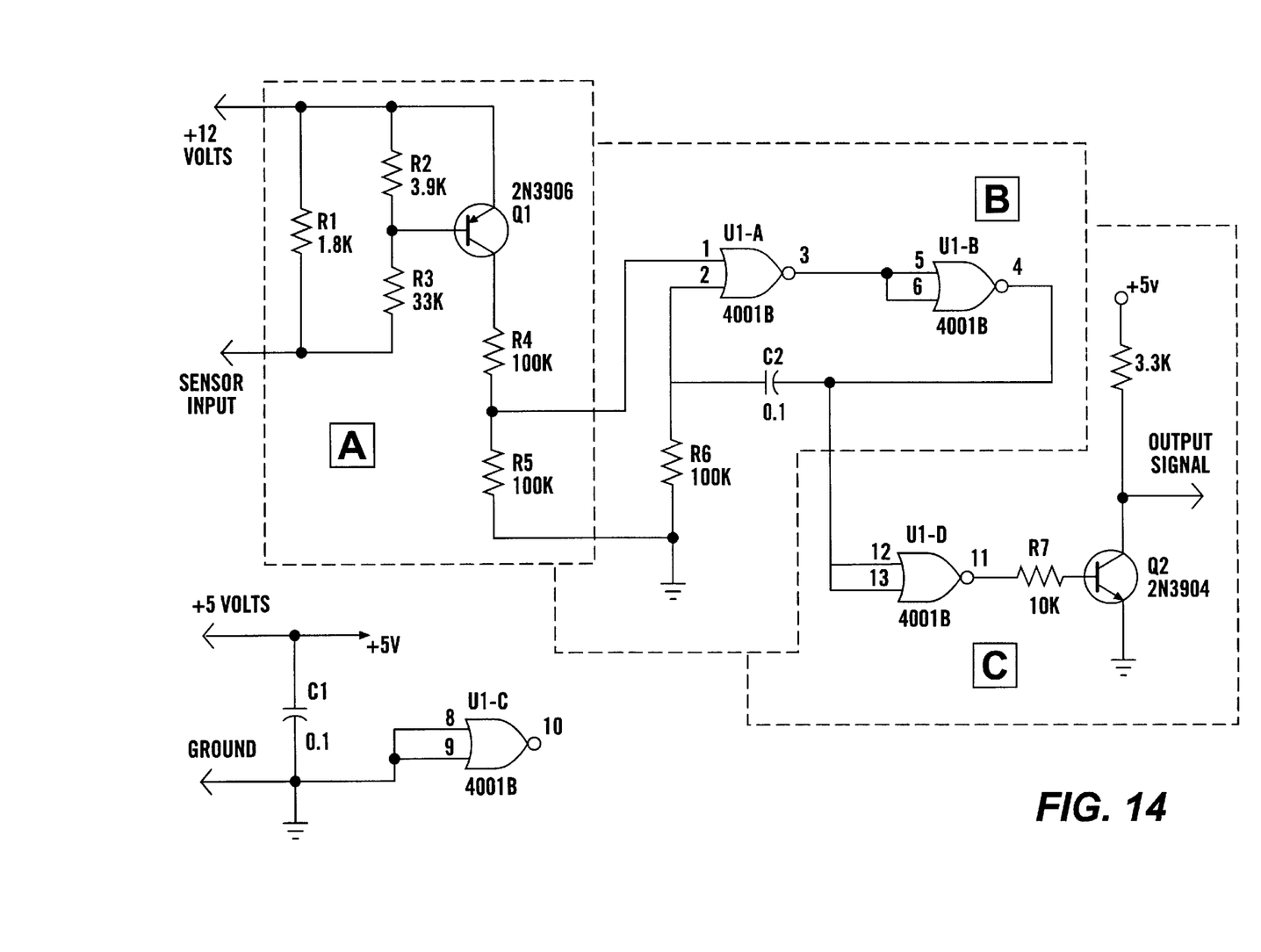
FIG. 14 is an electrical schematic of yet another embodiment of the circuitry of the present invention.

Several embodiments of the indicator 100 circuitry schematics as shown in FIGS. 12 through 14 are used to process the input pulses obtained from the proximity sensor. The first electrical schematic embodiment of FIG. 12 is separated into four sections. In section "A," the input signal provided from the proximity sensor is converted into a +5 volt signal. This circuit section is grounded (pulled to 0 volts) by the proximity sensor located on the mixer. This grounding activates the transistor Q1, which supplies power to the voltage divider resistors, R4 & R5. The voltage divider provides a 5 volt signal to circuit section "B."

Circuit section B of the first embodiment conditions the leading edge of the sensor input signal to insure that the relatively short pulses created by the sensor as the magnet passes are lengthened to have a time duration of about 7 milli-seconds. This is done by sending the signal from NOR gate 4001B, pin 4, into an RC network (capacitor C2 and resistor R6), and then feeding it back into pin 2 of the second NOR gate 4001B.

Circuit section "C" of the first embodiment conditions the trailing edge of the sensor input signal to insure that any short pulses created by the sensor disengaging the magnet are lengthened to have a time duration that is also about 7 milli-seconds. This is done by using the signal from NOR gate 4001B, pin 3, of the section B to charge an RC network (capacitor C3 and resistor R8), and then feeding it into pin 13 of NOR gate 4001B, located in section D. When the signal from the sensor disengages after the passing of the magnet mounted to a shaft, capacitor C3 will discharge through resistor R8 and lengthen the output signal time.

Circuit section "D" of the first embodiment combines the signals from sections B and C to provide an output signal that has conditioned leading and trailing edges, and that switches between +5 volts or ground (0 volts).

In the second electrical schematic embodiment of FIG. 13, the schematic is once again separated into four sections. In section A, the input signal provided from the proximity sensor is converted into a +5 volt signal. The sensor input is grounded by the sensor to activate transistor Q1. Transistor Q1 supplies power to the voltage divider defined by resistor R4 and resistor R5, and resistor R8 and resistor R9. The voltage divider of resistor R4 and resistor R5 provides a 5 volt signal to section B. The voltage divider of resistor R8 and resistor R9 provides a 5 volt signal to section "C."

Circuit section "B" of the second embodiment operates as it did in the first embodiment, and circuit section "C" of the second embodiment conditions the trailing edge of the sensor input signal to insure that any short pulses created by the sensor disengaging the magnet are lengthened to have a time duration that is about 7 milli-seconds. This is done by using the 5 volt signal from transistor Q1 to charge capacitor C3 through resistor R8 (section A). When the signal from the sensor disengages, capacitor C3 will discharge through resistor R9 (section A) to lengthen the output signal time.

Circuit section "D" of the second embodiment operates as it did in the first embodiment.

In the third electrical schematic embodiment of FIG. 14, the schematic is separated into three sections. In section "A" the input signal provided from the proximity sensor is converted into a +5 volt signal. The sensor input is grounded by the sensor to turn on the transistor Q1 that supplies power to the voltage divider of resistor R4 and resistor R5. The voltage divider provides a 5 volt signal to section "B."

Circuit section "B" of the third embodiment operates as it did in the first embodiment, and circuit section "C" of the third embodiment takes the signal from section B to provide an output signal that has a conditioned leading edge and switches between +5 volts and ground.

Figure 10:
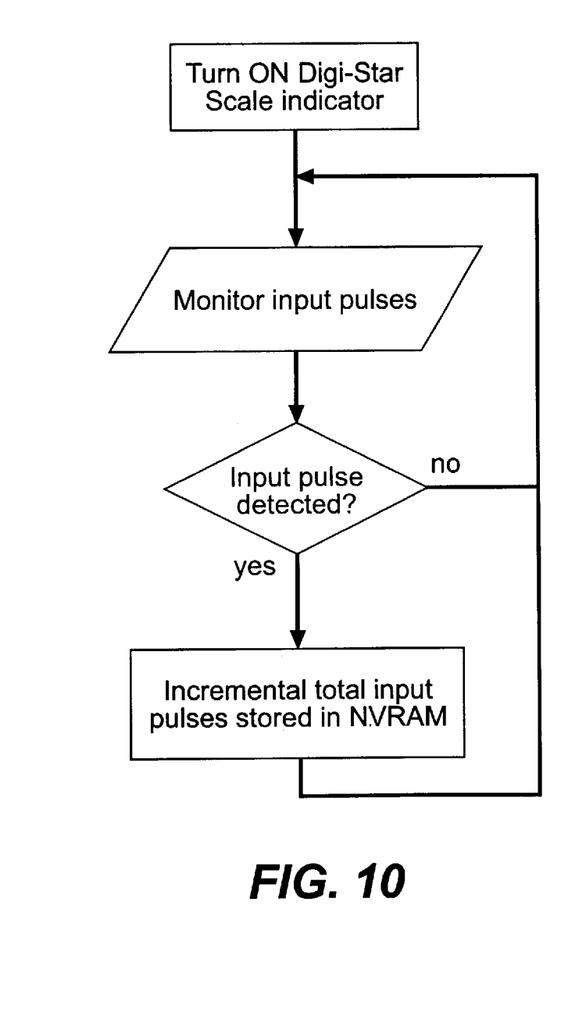
FIG. 10 is a flow chart showing that input pulses are stored in an electronic memory device.

The simplest aspect of the auger revolution counting function of indicator 100 is depicted in FIG. 10. This basically consists of turning the scale indicator or display on, monitoring the input pulses created by auger rotation and detected by the magnet and proximity sensor, and storing the input pulse count in NVRAM. The auger revolutions are displayed when the mixer counter is started by the operator. When the mixer counter is not activated, the weight of the materials being mixed is displayed.

Figure 9:
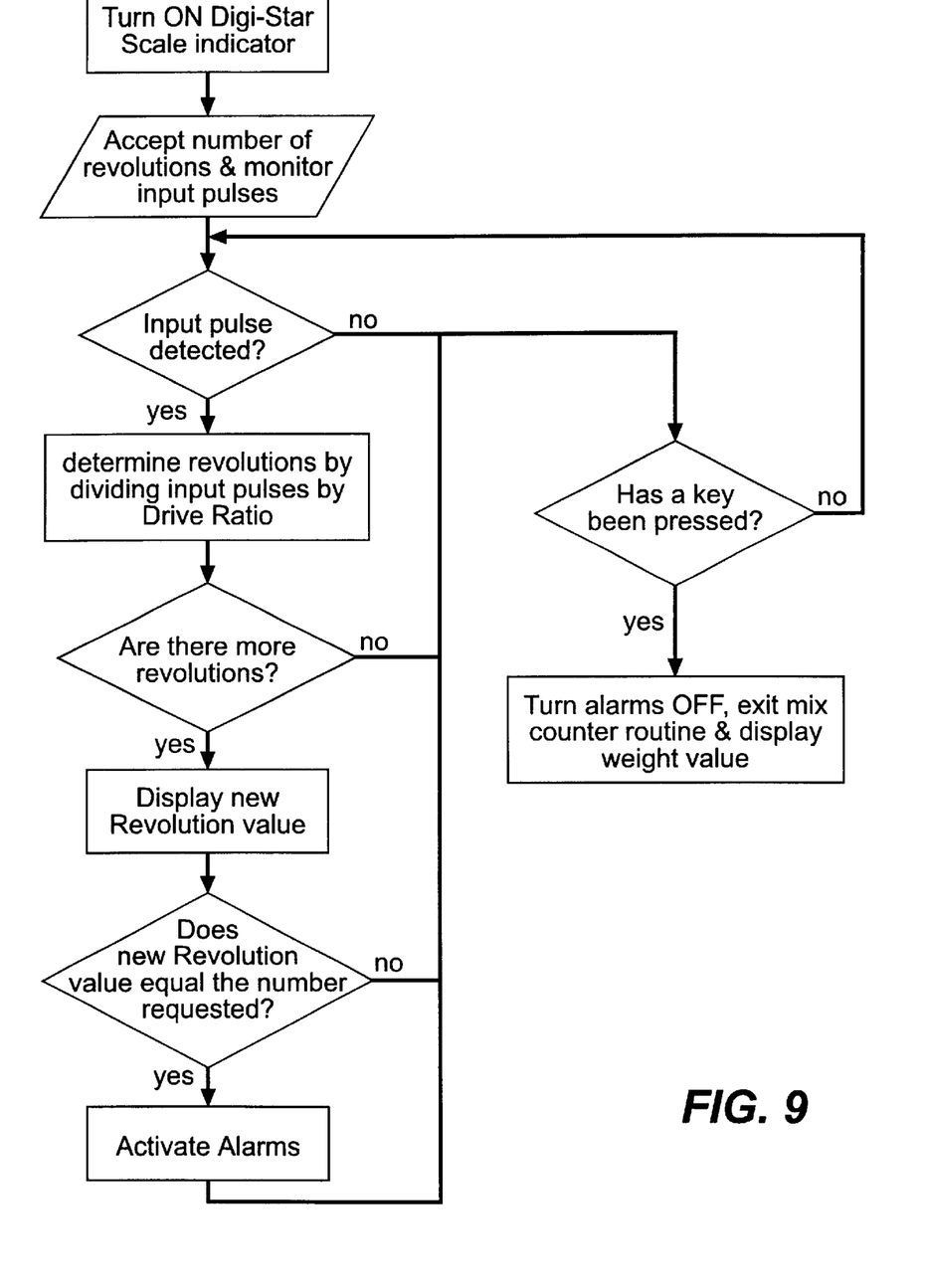
FIG. 9 is a flow chart showing the steps of the present invention.

In another embodiment of the counting function, an alarm 110 is used to indicate to the operator when mixing is complete. A flow chart showing this aspect of the invention is depicted in FIG. 9. First, the indicator is turned on. The number of desired auger revolutions is entered into the indicator, and the mixer is started. If input pulses are detected, they are displayed on the indicator.

The drive ratio is taken into account prior to such display. For example, if the drive ratio is 10:1, for every ten revolution of the drive shaft, one auger revolution is indicated on the display. The drive ratio is entered into indicator 100, and is also stored in the NVRAM.

An audible and/or visual alarm 110 is activated when the number of auger revolutions matches the number of revolutions input by the operator. The alarm is manually stopped (cleared) by operator. In another embodiment of the present invention, the mixer automatically stops when the desired number of revolutions has passed. This event may or may not be accompanied by an alarm. If input pulses are not detected, then the revolutions indicated on the display do not change.

Other optional embodiments of the present invention may include the following features or functions. First, auger revolutions and weight data may be simultaneously displayed on indicator 100. Second, a desired number of auger revolutions may be preprogrammed for various feed recipes, and the mixer counter can be automatically started once a number or letter string identifying the recipe to be mixed in entered into the indicator 100. Third, the mixer counter could be used as a control for the mixer by automatically stopping the mixer auger(s) from revolving after the desired number of auger revolutions has occurred. Fourth, the accumulated number of auger revolutions could be stored and used to trigger automatic maintenance reminder messages on the electronic display of indicatory 100. Fifth, indicator 100 could be connected or could otherwise send signals to an external device such as a computer. The signals sent to the computer may be data regarding: the amount of feed used over a period of time; information regarding the feeding practices of each animal herd; data useful for maintenance determination, i.e. auger replacement or bearing lubrication; or data showing the practices of a particular operator, i.e. how accurate the operator is in administering the proper feed that has been mixed according to the pre-determined number of revolutions.

EXAMPLE

This is one example of how an operator could use indicator 100 to mix forage materials and obtain the total number of revolutions. First, indicator 100 is turned on by the operator, and a greeting is displayed, i.e. the message "HELLO." Next, indicator 100 displays the weight value of the material in receptacle 13. If receptacle 13 is empty, the indicator will display "0" for the weight value, and receptacle 13 is filled with forage material and weighed prior to mixing.

Once the forage materials are ready to be mixed, the mixing function of indicator 100 is started by pressing a key on indicator 100, i.e. a [Timer] key. Indicator 100 will then display the number of auger revolutions previously used to mix the last batch of forage material. The operator can either use this number of revolutions, or mix the current batch of material by selecting a different number of revolutions. To input a different number of revolutions, certain indicator 100 keys (i.e. the [Select] and [Function] keys) are pressed to change the displayed value until the desired amount of mix revolutions are displayed, i.e. 25 revolutions. The operator presses the [Timer] or [On] key to set the revolutions and start the mixing counter At the start of mixing, indicator 100 displays the revolutions remaining from the set number, i.e. "REV 25".

The operator then starts the mixer auger(s). As the mixer auger(s) revolves, indicator 100 senses the electrical input pulses from the sensor mounted in a rotating shaft, as previously discussed. Preferably, indicator 100 displays a message indicating that the input pulses are being detected. The mixer counter will decrease the value displayed as the mixer auger(s) revolves. Once this value reaches "REV 0," the indicator 100 alarms are activated and the display begins to flash.

The operator then turns the feed mixer auger off to stop the auger(s) from mixing. Next, the operator presses a key on the indicator, i.e. a [Print] or [Timer] keys to de-activate the alarms and exit the mixer counter function. In this example, using the [Print] key to clear the alarms causes the "number of mixer revolutions" to be printed on a printing device that is either externally or internally connected to the indicator. The print data includes the weight, date, time and "number of mix revolutions." After exiting the mix counter function, the indicator displays the Gross weight.

Figure 11:
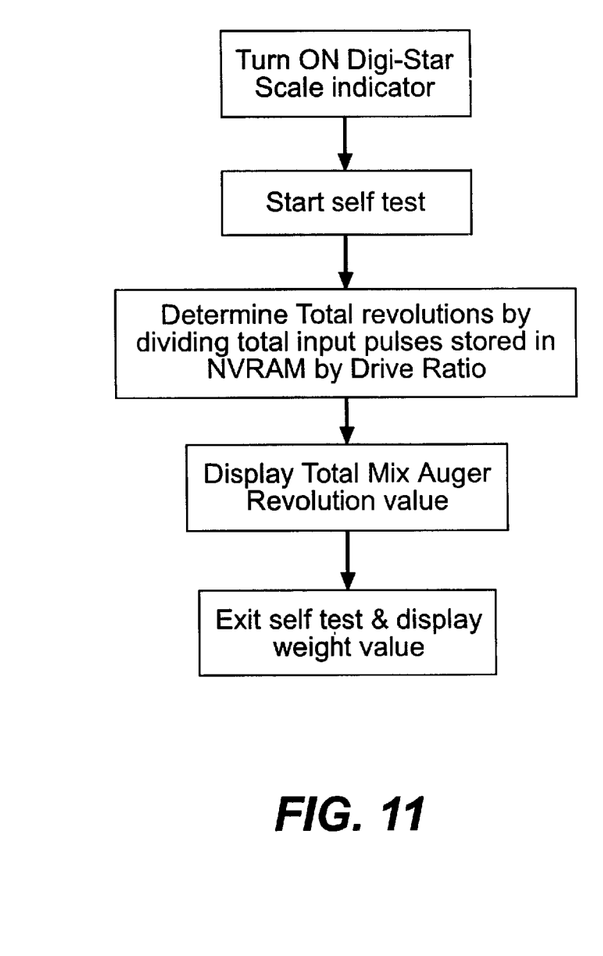
FIG. 11 is a flow chart showing a self-test subroutine for checking the accumulated auger revolutions.

The total accumulation of mixer revolutions occurring from the date of scale indicator installation is stored in the indicator memory. This is similar to a car odometer, but instead provides the mixer revolution count instead of mileage. The total mixer revolution is preferably displayed on indicator 100 during an indicator "self test," as seen in FIG. 11, and which is performed as follows. When indicator 100 is on, the operator presses a key on the indicator to start the test, i.e. press the [On] key a second time. The indicator then displays various messages, one of which is the message "REV XXXXXXXX," wherein XXXXXXXX is a number indicating the total number of mixer revolutions. The indicator returns to the weighing function after the self-test is completed. This cumulative total of auger revolutions is determined by dividing the total number of revolutions stored in NVRAM by the drive ratio.

The invention has been described by references to detailed examples and methodologies. These examples are not meant to limit the scope of the invention. Variations within the concepts of the invention are apparent to those skilled in the art.

I claim:

1. A combination mixer counter and weight calculator unit used when mixing and weighing agricultural forage in a mixing machine, the mixing machine composed of a mixing receptacle with at least one mixing auger therein, the unit comprising:
    a load cell for sensing weight, and adaptable for location on the mixing receptacle;
    a sensor for sensing rotation, and adaptable for location adjacent a rotatable shaft in the mixing machine;
    an electronic device housed in single unit for calculating and displaying the number of auger rotations used to mix the forage and for calculating and displaying the weight of the forage;
    an electrical cable connecting the sensor with the electronic device; and
    an electrical cable connecting the load cell with the electronic device.

2. The combination mixer counter and weight calculator unit of claim 1 wherein the sensor is a proximity sensor that senses each rotation of the shaft.

3. The combination mixer counter and weight calculator unit of claim 1 further including an electronic alarm integrated into the electronic device for signaling when a predetermined number of auger rotations has occurred.

4. A method for calculating the weight of agricultural forage and the number of revolutions used to mix such forage in a mixing machine with a single electronic device comprising:
    providing a mixing machine having a receptacle and an auger within the receptacle for mixing forage;
    attaching a load cell to the receptacle for sensing the weight of any forage placed therein;
    attaching a sensor to any shaft used to drive the auger;
    electrically connecting the load cell and the sensor to an electronic device capable of calculating weight and the number of auger revolutions from electrical signals supplied from the load cell and sensor, respectively; and
    calculating the number of auger revolutions by supplying electrical input pulses from the sensor to the electronic device.

5. The method of claim 4 further including the step of displaying the number of auger revolutions from the electronic device.

6. The method of claim 4 further including the step of downloading the number of auger revolutions from the electronic device to an external computer.

7. The method of claim 4 further including the step of inputting the drive ratio into the electronic device so that the actual number of auger revolutions can be displayed.

8. The method of claim 4 further including the step of calculating the weight of the forage within the receptacle by supplying electrical input pulses from the load cell to the electronic device.

9. The method of claim 8 further including the step of displaying the forage weight from the electronic device.

10. The method of claim 9 wherein the weight and number of auger revolutions are displayed simultaneously.

11. The method of claim 4 further including the step of inputting a predetermined number of auger revolutions into the electronic device.

12. The method of claim 11 further including the step of recording the number of auger revolutions in an electronic memory.

13. The method of claim 12 further including the step of recording the predetermined number of revolutions in the electronic memory for comparison to the number of auger revolutions, whereby it can be determined if the operator is allowing the forage to be sufficiently mixed.

14. The method of claim 4 further including the step of sounding an alarm when a predetermined number of auger revolutions has occurred.

15. A combination mixer counter and weight calculator unit used when mixing and weighing agricultural forage in a mixing machine, the mixing machine composed of a mixing receptacle with at least one mixing auger therein, the unit comprising:

a load cell contacting the receptacle;

a proximity sensor for sensing rotation, and adaptable for location adjacent a rotatable shaft in the mixing machine;

an electronic device housed in single housing unit, the device used for calculating and displaying the number of auger rotations used to mix the forage, and for calculating and displaying the weight of the forage;

an electrical cable connecting the proximity sensor and load cell with the electronic device, so that electrical signals from the load cell and the proximity sensor can be transmitted to the electronic device; and an alarm located on the electronic device for signaling when a predetermined number of auger rotations has occurred.

16. The combination mixer counter and weight calculator unit of claim 15 wherein an electronic circuit is electrically integrated into the electronic device for lengthening the duration of the electrical signal transmitted from the proximity sensor to the electronic device.

17. A mixing machine having a combination mixer counter and weight calculator unit used when mixing and weighing agricultural forage, the mixing machine comprising:

a mixing receptacle, the mixing receptacle having at least one mixing auger therein;

a load cell for sensing weight and for sending a signal related to the weight sensed, adaptable for location on the mixing receptacle;

a sensor for sensing rotation and for sending a signal related to the rotation sensed, adaptable for location adjacent a rotatable shaft in the mixing machine; and an electronic device housed in a single unit, which receives the signals from the load cell and the sensor, and calculates and displays the number of auger rotations used to mix the forage, and which calculates and displays the weight of the forage.

18. The mixing machine having a combination mixer counter and weight calculator unit of claim 17 wherein the sensor is a proximity sensor that senses each rotation of the shaft.

19. The mixing machine having a combination mixer counter and weight calculator unit of claim 18 wherein the rotatable shaft is a power takeoff shaft.

20. The mixing machine having a combination mixer counter and weight calculator unit of claim 18 wherein the rotatable shaft is a mixing machine drive shaft.

21. The mixing machine having a combination mixer counter and weight calculator unit of claim 18 wherein the rotatable shaft is a shaft that rotates at a different speed than the auger.

22. The combination mixer counter and weight calculator unit of claim 18 further including an electronic alarm integrated into the electronic device for signaling when a predetermined number of auger rotations has occurred.

23. A combination mixer counter and weight calculator unit used when mixing and weighing agricultural forage in a mixing machine, the mixing machine composed of a mixing receptacle with at least one mixing auger therein, the unit comprising:

a first sensing means for sensing rotation, and adaptable for location in relation to a rotatable shaft turning the auger in the mixing machine, to sense rotations of the shaft and auger, and create a signal relating to the sensed rotations of the shaft;

a second sensing means for sensing weight, and adaptable for location on the mixing receptacle, to create a signal relating to the sensed weight; and electronic means for accepting the signals from the first and second sensing means and calculating and displaying on a single unit the number of shaft rotations by the auger, used to mix the forage, and calculating and displaying the weight of the forage in the mixing receptacle.

24. The combination mixer counter and weight calculator unit of claim 23 wherein the first sensing means is a proximity sensing means that senses each rotation of the shaft.

25. The combination mixer counter and weight calculator unit of claim 23 further including an electronic alarming means for signaling when a predetermined number of auger rotations has occurred, the electronic alarming means integrated into the electronic means.

* * * * *